US006567532B1

(12) United States Patent
Honsinger

(10) Patent No.: US 6,567,532 B1
(45) Date of Patent: May 20, 2003

(54) METHOD AND COMPUTER PROGRAM FOR EXTRACTING AN EMBEDDED MESSAGE FROM A DIGITAL IMAGE

(75) Inventor: Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/453,247

(22) Filed: Dec. 2, 1999

(51) Int. Cl.[7] .................................................. G06K 9/00
(52) U.S. Cl. ..................................................... 382/100
(58) Field of Search ............................... 382/100, 232; 380/51, 54; 713/176

(56) References Cited

U.S. PATENT DOCUMENTS

| 5,835,639 A |   | 11/1998 | Honsinger et al. |         |
|-------------|---|---------|------------------|---------|
| 5,859,920 A | * | 1/1999  | Daly et al.      | 380/54  |
| 5,862,260 A | * | 1/1999  | Rhoads           | 382/100 |
| 6,044,156 A | * | 3/2000  | Honsinger et al. | 380/54  |
| 6,141,441 A | * | 10/2000 | Cass et al.      | 600/455 |
| 6,424,725 B1| * | 7/2002  | Rhoads et al.    | 382/100 |

* cited by examiner

Primary Examiner—Bhavesh M. Mehta
Assistant Examiner—Aaron Carter
(74) Attorney, Agent, or Firm—Peyton C. Watkins

(57) ABSTRACT

A method for improving the signal quality of a digital watermark utilizing measurements of signal and noise values of multiple digital watermark estimates is provided. In particular, each digital watermark estimate is weighted by a function of its signal to noise ratio and then summed to form an improved digital watermark.

16 Claims, 3 Drawing Sheets

ND COMPUTER PROGRAM FOR
METHOD AND COMPUTER PROGRAM FOR EXTRACTING AN EMBEDDED MESSAGE FROM A DIGITAL IMAGE

The disclosure in the CD-ROM appendix of this patent disclosure of this patent document contains material to which a claim of copyright protection is made. The copyright owner has no objection to the reproduction of any one of the patent documents or the patent disclosure, as it appears in the U.S. Patent and Trademark Office patent file or records, but reserves all other rights whatsoever.

FIELD OF THE INVENTION

The invention relates generally to the field of image processing, and in particular to embedding and extracting hidden messages in digital image data. This field is also referred to as data hiding, information hiding, watermarking and also steganography.

BACKGROUND OF THE INVENTION

U.S. Pat. No. 6,044,156, issued Mar. 28, 2000, entitled "Method For Generating An Improved Carrier For Use In An Image Data Embedding Application," by Honsinger et al., discloses a technique for embedding messages in digital images data. This method for embedding a hidden message into a digitized image includes the steps of providing a message template indicating the relative locations of data in the embedded message, the relative locations of the data being such that the autocorrelation of the message template is strongly peaked; placing message data at the data locations defined by the template; convolving the message data in the template with a carrier to form a dispersed message; and combining the dispersed message with the image.

The hidden messages are recovered from the embedded hidden message image by cross correlating the embedded hidden message image containing the dispersed message with a decoding carrier to recover the embedded dispersed message; and extracting the digital message data from the recovered dispersed message employing the message template to locate the message data.

One problem with the above described approach is that when the digital image is very noisy, for example when it is formed by scanning an inkjet printed image on ordinary paper, the method sometimes does not work to recover the embedded message. There is a need therefore for an improved method of recovering the embedded message.

SUMMARY OF THE INVENTION

The problem is solved according to the present invention by providing a method for extracting an embedded message from a digital image, the embedded message being formed by arranging message bits in predetermined locations represented by a message template, convolving the message with a random phase, flat Fourier amplitude carrier to form a dispersed message and tiling the dispersed message over the image, that includes the steps of:

a) locating the tile boundaries in the digital image;
b) correlating a tile with the carrier to extract the embedded message;
c) forming a multiplier A that is inversely proportional to the noise in the extracted message;
d) multiplying the embedded message by A to form a weighted embedded message;
e) repeat steps b) to d) for a second tile to generate a second weighted embedded message;
f) summing the weighted embedded messages to form a summed weighted embedded message; and
h) extracting the message bits from the summed weighted embedded message.

The method has the advantage of improving the signal quality for data embedding applications by weighting each recovered embedded message inversely with respect to noise in the recovered message and adding the recovered messages to reinforce the signal and cancel the noise. The improvement due to the method can be significant for images with large variations in business, such as portraits, or in images that are very noisy, such as digital images produced by scanning ink jet prints on plain paper.

DETAILED DESCRIPTION OF THE INVENTION

The present invention is useful for extracting hidden messages from photographic images recorded on film or paper and images that have been produced using digital printing techniques such as inkjet, electrographic, or thermal printing.

Figure 1:
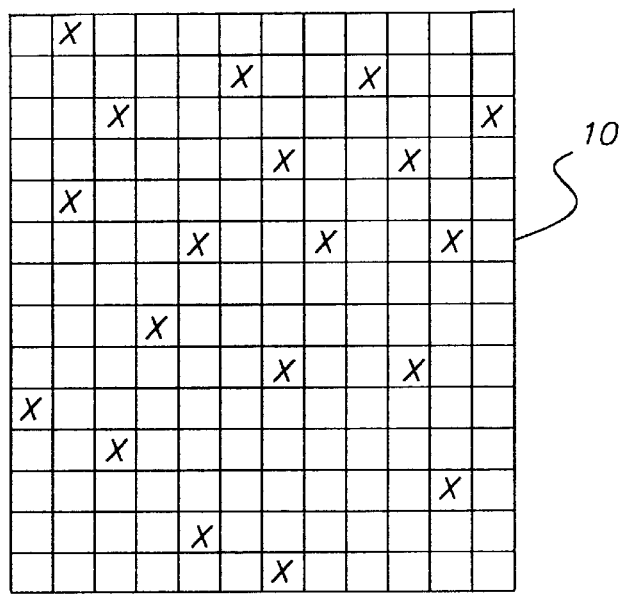
FIG. 1 is a block diagram illustrating steps employed in preparing an image for the application of the present invention.

Referring to FIG. 1, the present invention employs a message template 10 that is used to indicate the location of the data in a message that is to be embedded in an image. The locations, indicated by the x's in FIG. 1, are filled in a predetermined order so that the extraction algorithm knows where to look for the data. As shown in FIG. 1 the message template 10 is represented as a rectangular array of pixel locations, however, it is recognized that its implementation could be a set of ordered values in a lookup table indicating the locations of the message data in an array. The message to be embedded is represented by a stream of bits. The stream of bits are represented as + or −1 (+1 representing an original bit value of 1 and −1 representing an original bit value of 0) at the locations indicated by an "x" in the template; all other locations are filled by 0's. The template is used both to embed and to extract message data from the digital image. It is preferred that the image be represented using floating point numbers so that issues of quantization and sign are minimized.

The template is used in both the embedding and the extraction process. The embedding process is performed by convolving the message data with a random phase carrier having substantially uniform amplitude in the frequency domain to produce a dispersed message and the dispersed message is combined with the image as shown in the following equation.

$$I'(x,y)=I(x,y)+(\alpha(M(x,y)*C(x,y)), \quad \text{Eq. (1)}$$

where I' (x,y) is the digital image having an embedded message, I(x,y) is the original digital image; * represents the operation of cyclic convolution; α is a multiplicative constant chosen to make the embedded message invisible to the human observer; M(x,y) is the original message; and C(x,y) a random carrier, which is substantially of uniform amplitude in the frequency domain, with the exception of very low frequencies which are zero, resulting in a carrier with zero mean.

Figure 2:
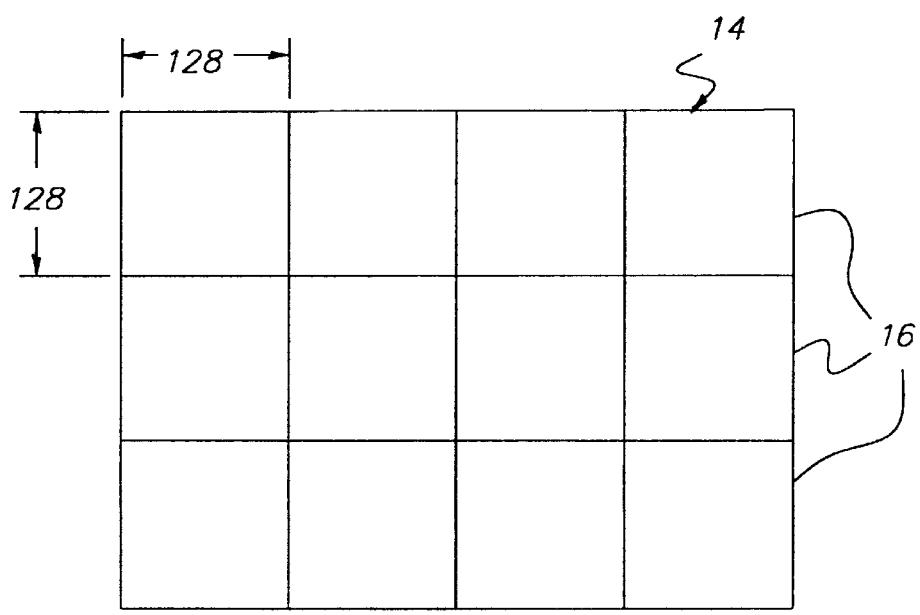
FIG. 2 is a diagram showing a message tiling pattern in a digital image.

As shown in FIG. 2, the dispersed message 16 is embedded in the digital image by tiling the dispersed message onto the digital image 14. The preferred tile size of the dispersed message is 128×128 pixels. This implies that the message template, message, and carrier are also 128×128 pixels.

Before the message is recovered, possible changes in rotation and scale need to be corrected for. The rotation and scale correction can be accomplished using the technique described in U.S. Pat. No. 5,835,639 issued Nov. 10, 1998 to Honsinger et al., entitled "Method For Detecting Rotation and Mangification in Images." If the location of the tiles in the digital image are known, the recovery of the embedded message can proceed directly. However if the boundary location of the tiles are not known, the tile location can be determined as described in U.S. Ser. No. 09/453,160, filed Dec. 2, 1999, entitled, "Method and Computer Program for Embedding and Extracting an Embedded Message from a Digital Image," by Honsinger.

The recovery of a tile of the dispersed message, is described by the following equations. If we correlate both sides of equation 1) with C(x,y) as follows, $$I'(x,y) \otimes C(x,y) = I(x,y) \otimes C(x,y) + (\alpha(M(x,y)*C(x,y))) \otimes C(x,y) \quad \text{Eq. (2)}$$

the result will be an original message corrupted somewhat by noise. The first term, representing the corrupting noise, is small, $I(x,y) \otimes C(x,y) \approx 0$. So that, $$I'(x,y) \otimes C(x,y) \approx \alpha(M(x,y)*(C(x,y) \otimes C(x,y))) \quad \text{Eq. (3)}$$

And furthermore, since the carrier is random, and substantially uniform in amplitude in the frequency domain, $$C(x,y) \otimes C(x,y) \approx \delta(x,y) \quad \text{Eq. (4)}$$

So that, $$I'(x,y) \otimes C(x,y) \approx \alpha(M(x,y)) \quad \text{Eq. (5)}$$

The above analysis shows that the end result of correlating the tile with the carrier is the original message.

Figure 3:
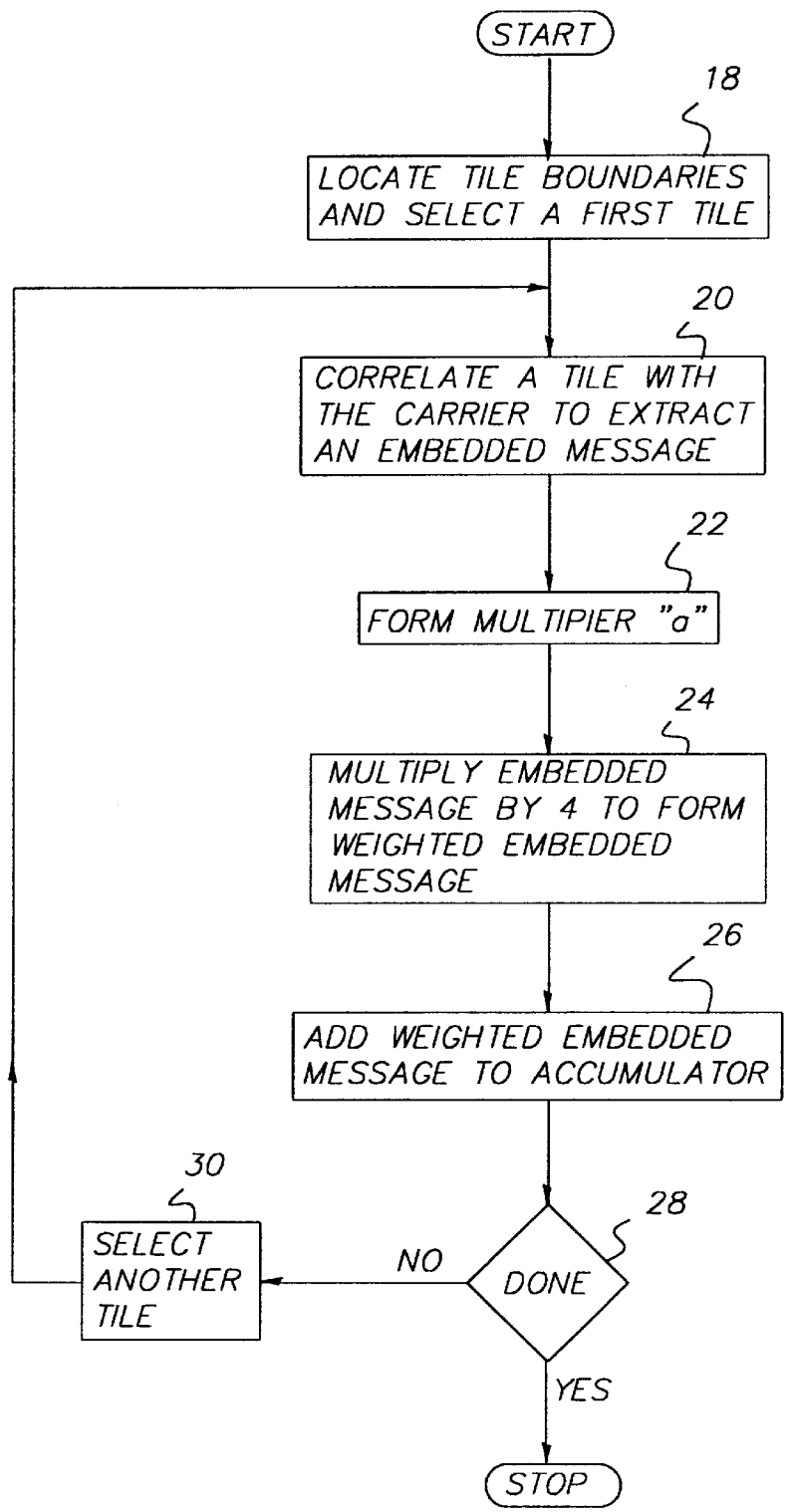
FIG. 3 is a flow chart illustrating the method of the present invention.

Referring to FIG. 3, an embedded message that has been formed by arranging message bits in predetermined locations represented by a message template, convolving the message with a random phase, flat Fourier amplitude carrier to form a dispersed message and tiling the dispersed message over the image, is recovered from a digital image by first locating the tile boundaries in the digital image and selecting a first tile (18). Next the selected tile is correlated with the random phase carrier to extract the embedded message (20). A multiplier A representing a weighting factor that is inversely proportional to the amount of noise in the extracted message is formed (22). For example, the weighting factor can be simply the reciprocal of the average value of the noise in the recovered message. Preferably, the weighting factor is the variance of the signal divided by the variance of the noise in the recovered message.

The embedded message is then multiplied (24) by A to produce a weighted embedded message. The weighted embedded message is added (26) to an accumulator (which has been initialized to zero) and tested (28) to determine if the signal to noise ratio of the accumulated weighted message is acceptable. If acceptable, the process is complete. Otherwise, a new tile is selected (30) and the process is repeated until the signal to noise ratio of the accumulated weighted message is acceptable.

In a preferred embodiment of the invention, for a message having dimensions of 128×128 pixels and containing 130 bits of information, each bit being represented by one pixel, a signal to noise ratio of 2.3 has been found to be an useful criterion for stopping.

Figure 4:
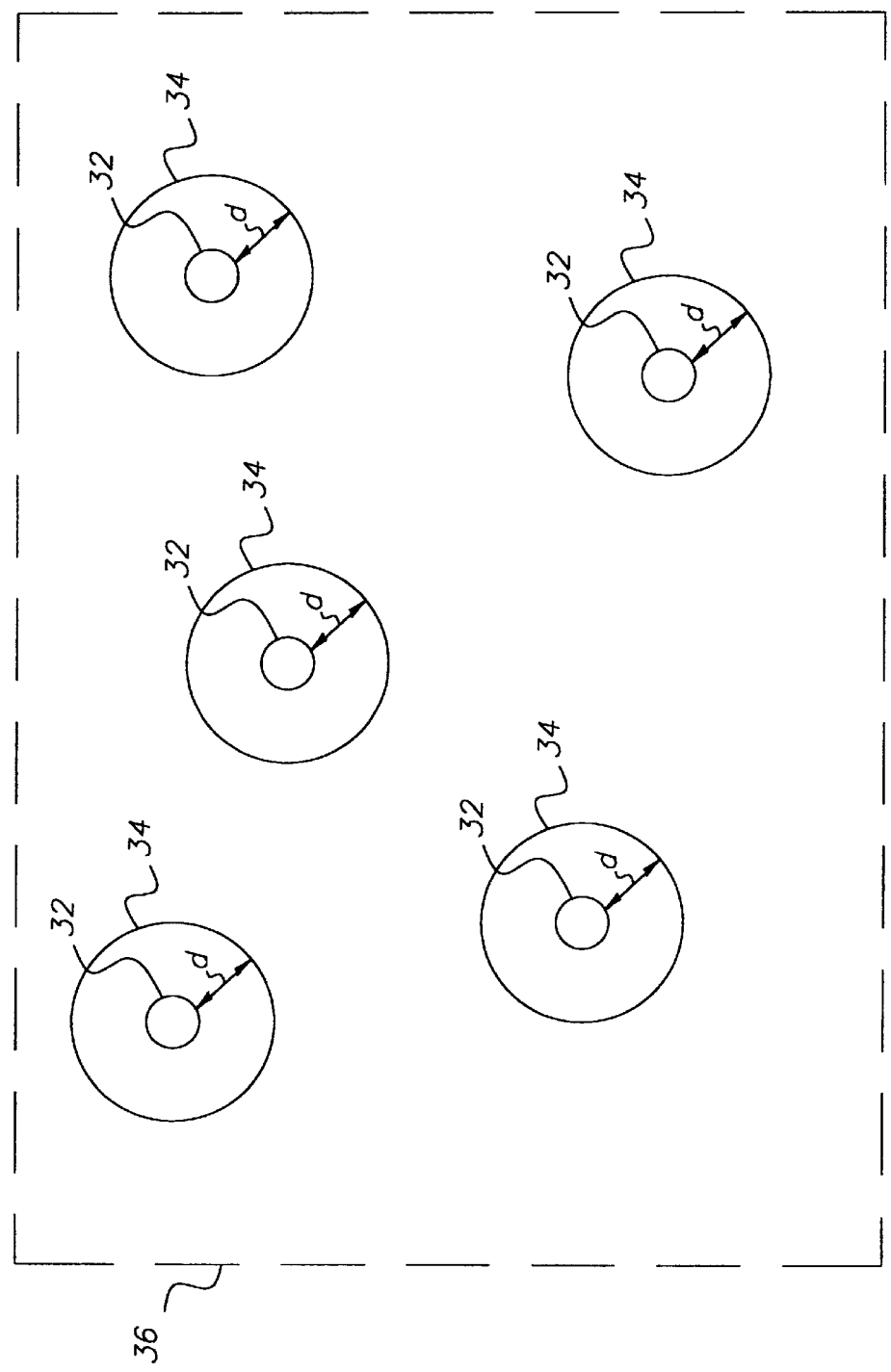
FIG. 4 is a diagram useful in describing the message data.

The formation of the preferred embodiment of multiplier A will now be described in more detail with reference to FIG. 4. The figure represents a portion of an extracted embedded message. Each message bit 32 is surrounded-by a region of ambiguity 34 having a diameter d. The value of diameter d is chosen based on the application. For most applications a value of 2 or 3 pixels for d works well. These regions of ambiguity are not clearly message bits, and not clearly background, they are the sidelobes of the recovered message bits. The region 36 outside of the regions of ambiguity are background.

To calculate the multiplier A, the overall message is first squared to make all the values positive. The template is used to determine where the message bits are located. The average squared value of the message bits (equal to the variance of the message bits) is calculated, and the average squared value of the background bits (equal to the variance of the message bits) is calculated. The ratio of the average squared value of the message bits to the average squared value of the background bits is equated to the multiplier A.

The reason that this approach works is because as the noise decreases, the factor A increases, giving more weight to the corresponding version of the embedded message. As the various weighted versions of the embedded message are accumulated (added pixel by pixel), the signal, which is deterministic, reinforces and the noise, which is relatively random tends to cancel out.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM)or read only memory (ROM); or any other physical device or medium employed to store a computer program.

Appendix A contains a computer program written in the C++ language for extracting an embedded message from a digital image according to the present invention.

The invention has been described in detail with particular reference to certain preferred embodiments thereof, but it will be understood that variations and modifications can be effected within the spirit and scope of the invention.

PARTS LIST 10 message template
12
14 digital image
16 dispersed message
18 select first tile step
20 extract embedded message step
22 form multiplier A step
24 multiplication step
26 add weighted embedded message to accumulator step
28 test for completion step
30 select new tile step 32 message bit
34 region of ambiguity
36 background region

What is claimed is:

1. A method for extracting an embedded message from a digital image, the embedded message being formed by arranging message bits in predetermined locations represented by a message template, convolving the message with a random phase, flat Fourier amplitude carrier to form a dispersed message and tiling the dispersed message over the image, comprising the steps of:
   a) locating the tile boundaries in the digital image;
   b) correlating a tile with the carrier to extract the embedded message;
   c) forming a multiplier A that is inversely proportional to the noise in the extracted message;
   d) multiplying the embedded message by A to form a weighted embedded message;
   e) repeat steps b) to d) for a second tile to generate a second weighted embedded message;
   f) summing the weighted embedded messages to form a summed weighted embedded message; and
   h) extracting the message bits from the summed weighted embedded message.

2. The method claimed in claim 1, wherein the multiplier A is the signal variance divided by the noise variance in the embedded message, and the step of forming the multiplier A, comprises the steps of:
   a) forming a positive embedded message;
   b) employing the message template to locate message bit and background noise sample locations in the embedded message;
   c) forming an average of a plurality of message bit samples and an average of a plurality of background noise samples; and
   d) dividing the average of the message bit samples by the average of the background noise samples to form the multiplier A.

3. The method claimed in claim 2, wherein the positive embedded image is formed by squaring the values in the embedded message.

4. The method claimed in claim 2, wherein the step of locating message bit and background noise sample locations in the embedded message, comprise the step of:
   a) identifying an annular region around each message bit location representing an ambiguous region;
   b) selecting the message bit samples inside the annular regions, and
   c) selecting the background noise samples outside the annular regions.

5. The method claimed in claim 1, further comprising the step of correcting the rotation and scale of the digital image prior to identifying the tile boundaries.

6. The method claimed in claim 1, further comprising the step of testing the summed weighted embedded message for signal quality, and repeating steps b) to d) until a predetermined quality is achieved.

7. The method claimed in claim 6, wherein the testing comprises testing the message for errors using an error detection code.

8. The method claimed in claim 6, wherein the testing comprises comparing the signal to noise ratio of the summed weighted embedded message to a predetermined threshold.

9. A computer program embodied on a computer readable medium for extracting an embedded message from a digital image, the embedded message being formed by arranging message bits in predetermined locations represented by a message template, convolving the message with a random phase, flat Fourier amplitude carrier to form a dispersed message and tiling the dispersed message over the image, comprising the steps of:
   a) locating the tile boundaries in the digital image;
   b) correlating a tile with the carrier to extract the embedded message;
   c) forming a multiplier A that is inversely proportional to the noise in the extracted message;
   d) multiplying the embedded message by A to form a weighted embedded message;
   e) repeat steps b) to d) for a second tile to generate a second weighted embedded message;
   f) summing the weighted embedded messages to form a summed weighted embedded message; and
   h) extracting the message bits from the summed weighted embedded message.

10. The computer program product claimed in claim 9, wherein the multiplier A is the signal variance divided by the noise variance in the embedded message, and the step of forming the multiplier A, comprises the steps of:
    a) forming a positive embedded message;
    b) employing the message template to locate message bit and background noise sample locations in the embedded message;
    c) forming an average of a plurality of message bit samples and an average of a plurality of background noise samples; and
    d) dividing the average of the message bit samples by the average of the background noise samples to form the multiplier A.

11. The computer program product claimed in claim 10, wherein the positive embedded image is formed by squaring the values in the embedded message.

12. The computer program product claimed in claim 10, wherein the step of locating message bit and background noise sample locations in the embedded message, comprise the step of:
    a) identifying an annular region around each message bit location representing an ambiguous region;
    b) selecting the message bit samples inside the annular regions, and
    c) selecting the background noise samples outside the annular regions.

13. The computer program product claimed in claim 9, further comprising the step of correcting the rotation and scale of the digital image prior to identifying the tile boundaries.

14. The computer program product claimed in claim 9, further comprising the step of testing the summed weighted embedded message for signal quality, and repeating steps b) to d) until a predetermined quality is achieved.

15. The computer program product claimed in claim 14, wherein the testing comprises testing the message for errors using an error detection code.

16. The computer program product claimed in claim 14, wherein the testing comprises comparing the signal to noise ratio of the summed weighted embedded message to a predetermined threshold.

* * * * *